United States Patent [19]

Bryer

[11] Patent Number: 4,637,109
[45] Date of Patent: Jan. 20, 1987

[54] CONTROLLED DEFLECTION ROLLER

[75] Inventor: Jack Bryer, York, Pa.

[73] Assignee: Motter Printing Press Co., York, Pa.

[21] Appl. No.: 791,561

[22] Filed: Oct. 25, 1985

Related U.S. Application Data

[63] Continuation of Ser. No. 492,477, May 6, 1983, abandoned.

[51] Int. Cl.⁴ .................... B21B 13/02; B21B 31/32
[52] U.S. Cl. ..................... 29/116 AD; 29/113 AD; 29/130; 100/162 B
[58] Field of Search .......... 29/116, 116 AD, 113 AD, 29/129, 130; 100/162 B

[56] References Cited

U.S. PATENT DOCUMENTS 3,745,625  7/1973  Jaegers et al. ............... 29/116 AD
4,440,077  4/1984  Schiel ........................... 29/113 AD
4,457,057  7/1984  Pau ............................... 29/116 AD Primary Examiner—Howard N. Goldberg
Assistant Examiner—Irene G. Golabi
Attorney, Agent, or Firm—Brumbaugh, Graves, Donohue & Raymond

[57] ABSTRACT

A cylinder construction in which a flexing force can be exerted on the interior surface of a hollow cylinder intermediate the ends thereof. The hollow cylinder is mounted for rotation about a shaft having an eccentric bearing intermediate the ends thereof. An eccentric bearing at each end of the shaft is adjustable to neutralize the effect of the intermediate bearing or to adjust the flexing force on the cylinder.

5 Claims, 4 Drawing Figures

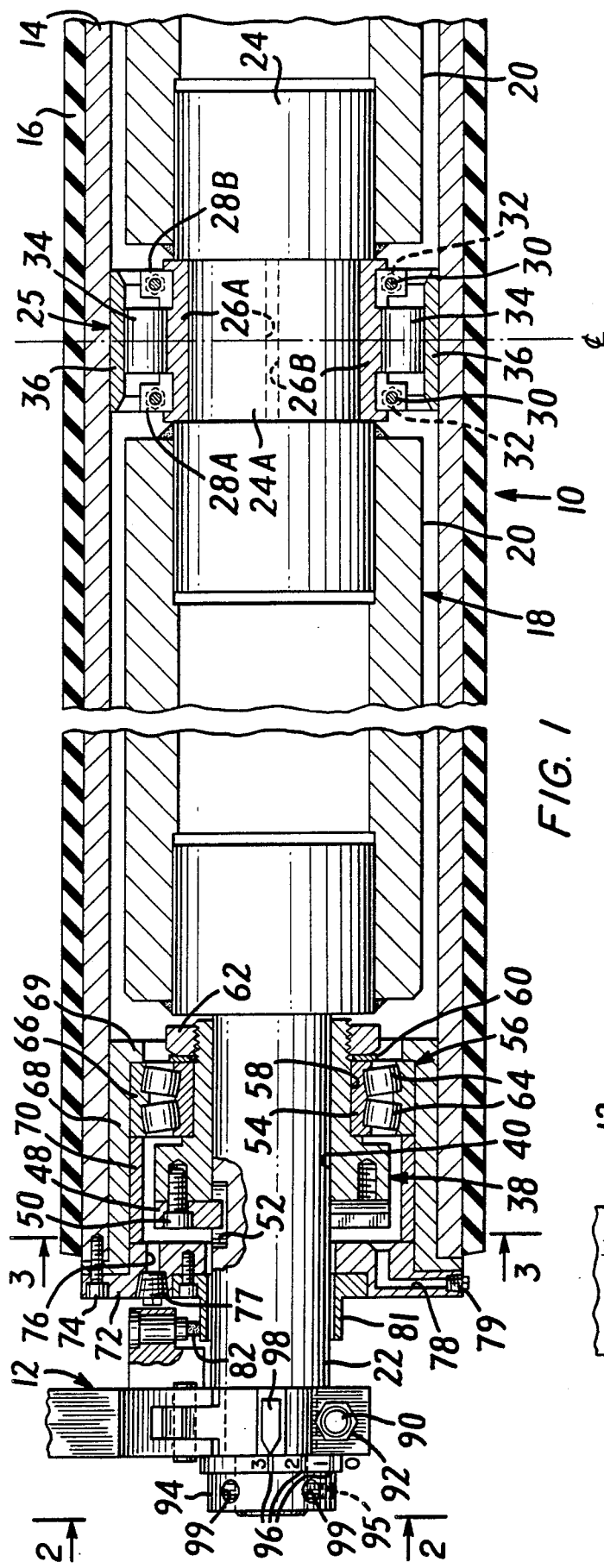
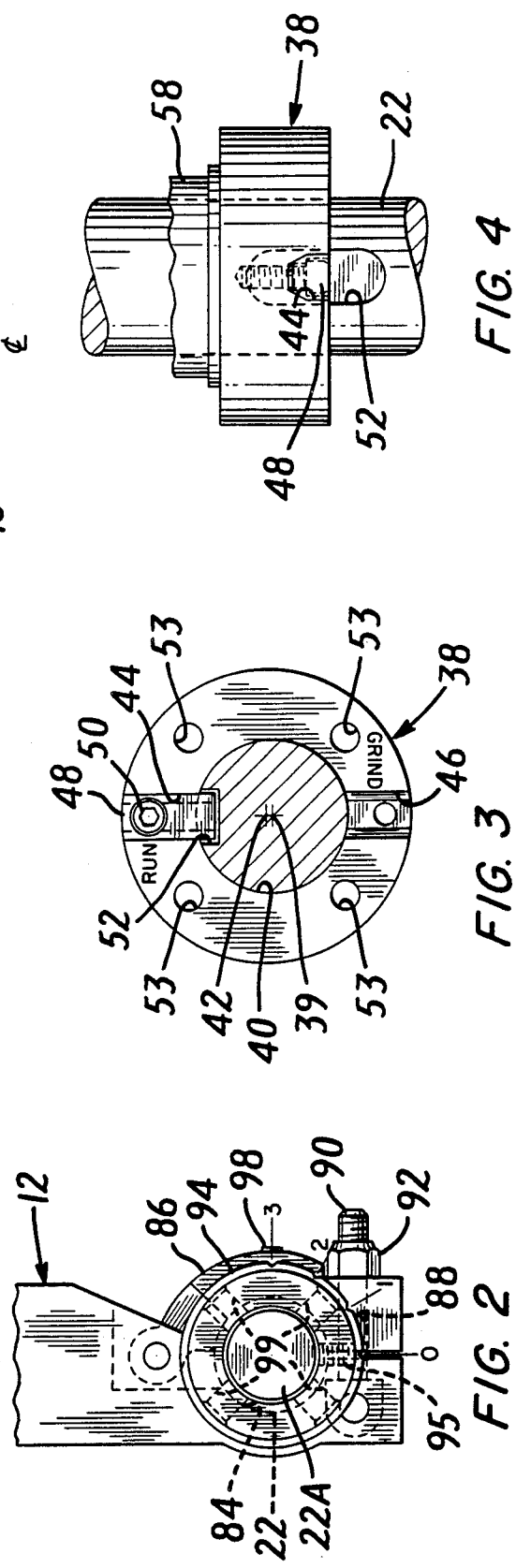

CONTROLLED DEFLECTION ROLLER

This application is a continuation of application Ser. No. 492,477 filed on May 6, 1983, now abandoned.

BACKGROUND OF THE INVENTION

This invention relates to a roller or cylinder construction and more particularly to a roller or cylinder which engages and cooperates with another roller or cylinder, the axes of which are substantially parallel, the engagement of the rollers with each other tending to flex one of the rollers.

There are many applications in the printing industry where deflections of only a few thousandths of an inch can cause serious deficiencies. Examples of such a pair of rollers or cylinders are the impression roller and plate cylinder of a gravure press, the ink rollers and plate cylinders of flexographic and letter presses, and the rollers for supplying ink and water to the plate cylinder of an offset press. Another example of the requirement for a uniform contact between two rollers is in calendering in the making of paper, for example.

U.S. Pat. No. 2,261,740 discloses cylinder structures in which a hollow cylinder is mounted for rotation about a sleeve surrounding a shaft. Relative motion between the sleeve and the shaft causes interacting camming elements to exert a radial force on the inside of the hollow cylinder intermediate the ends thereof to neutralize the prevailing deflecting stresses. These structures require considerable structure to be located inside the hollow cylinder midway of its length, which causes difficulties in the assembly of the cylinder as well as in the reliability and maintenance thereof.

SUMMARY OF THE INVENTION

The present invention is an improved roller that is so mounted that when it is applied in rolling engagement with another roller, a uniform contact and engagement between the rollers are obtained. The invention has particular application in the printing industry, but may also be employed in industries such as paper making, where two cooperating rollers engage material in rolling contact.

A hollow cylinder is mounted for rotation about a shaft disposed therein. A bearing for the cylinder is eccentrically mounted on the shaft intermediate the ends thereof for flexing the cylinder in the desired direction, and the shaft may be rotationally adjusted to determine the direction of flexure. Another bearing for the cylinder is eccentrically mounted on at least one end of the shaft and this mount is rotationally adjustable between a position in which the eccentricity of the end mount coincides with that of the intermediate mount, so that no flexing force is exerted on the cylinder, and positions rotationally displaced therefrom in which the magnitude and direction of the flexing force vary.

This arrangement requires only one or more simple, non-adjustable eccentric bearings intermediate the ends of the hollow cylinder, all adjustable elements being at the ends thereof. Even so, by aligning the eccentricity of the bearings the shaft is easily mounted within the hollow cylinder, and since no flexing force is exerted on the cylinder it (or any covering thereon) may be ground or reground to provide the desired surface.

BRIEF DESCRIPTION OF THE DRAWINGS

For a better understanding of the invention, reference is made to the following detailed description of a preferred embodiment, taken in conjunction with the accompanying drawings, in which:

FIG. 1 is a partial longitudinal section of a roller construction in accordance with the invention;

FIG. 2 is a partial view taken along the line 2—2 of FIG. 1 and looking in the direction of the arrows;

FIG. 3 is a partial view taken along the line 3—3 of FIG. 1 and looking in the direction of the arrows; and FIG. 4 is a plan view of the eccentric adapter shown in FIG. 3.

DETAILED DESCRIPTION OF A PREFERRED EMBODIMENT

Referring to FIG. 1, an impression roller 10 is mounted for rotation at each end to a corresponding side frame 12, which is reciprocably mounted so that the impression roller can be raised from and lowered against a conventional design cylinder (not shown), the impression roller and the design cylinder comprising a two roller rotogravure printing system well known to the art.

The roller 10 includes a hollow cylinder or tube 14, which has a conventional rubber covering 16 used for impression rollers. A control shaft 18, is adjustably mounted at each end to the corresponding side frame 12 and extends through the hollow cylinder 14 and is preferably coaxial therewith.

The control shaft 18 comprises two tubes 20, two end shafts 22 secured thereto, and one eccentric shaft 24 secured to and between the tubes 20. The end shafts 22 are concentric to each other and the tubes 20, but the eccentric shaft 24 includes a central portion 24A that is eccentric to the other components of the control shaft 18. The eccentricity of the center shaft portion 24A is only a matter of thousandths of an inch, and so the eccentricity is not shown in FIG. 1.

Mounted around the eccentric shaft portion 24A is a split inner race of a bearing 25 comprising race halves 6A and 26B, which are secured to the shaft by two split hold-down clamps 28A and 28B, corresponding clamp halves being bolted together by bolts 30 and nuts 32. The two gaps between each pair of clamp halves are preferably kept substantially equal, for example using shims, as are the two gaps between the race halves 26A and 26B.

A plurality of conventional rollers 34 are mutually spaced around the inner race by a conventional split cage (not shown) and also rollingly engage an outer race 36, which is a hardened steel sleeve that is mounted within the hollow cylinder 14 by a force fit.

On each end of the control shaft 18, on the end shaft 22 thereof, is an eccentric adapter 38, which is a sleeve rotatably mounted on the end shaft. The axis 39 of the longitudinal bore 40 through the adapter 38 (see also FIG. 3) is eccentric to the axis 42 of the adapter, it being understood that this eccentricity is only a matter of thousands of an inch and is exaggerated in FIG. 3. Accordingly, the peripheral surface of the adapter is eccentric to the axis of the end shaft 22 and thus the control shaft 18. Preferably the eccentricity of the adapter 38 equals that of the central shaft portion 24A.

The eccentric adapter 38 may be secured in one of two positions in which the eccentricity is up, as shown in FIG. 3, or down. To this end, there are two substantially colinear keyways 44 and 46 (see also FIGS. 3 and 4) in the face of the adapter that are adapted to receive a key wedge 48, a screw 50 securing the key wedge in the desired one of the keyways. The keyways 44 and 46 are preferably lined up with the eccentricity of the adapter 38.

There is a keyway 52 in the end shaft 22 adapted to receive the inner end of the key wedge 48, the keyway 52 preferably being in the side of the control shaft 18 remote from the direction of eccentricity of the eccentric shaft portion 24A, which extends downwardly in FIG. 1. Accordingly, the eccentricity of the adapter 38 extends either opposite to, or in the same direction with, the eccentricity of the shaft portion 24A depending upon which of the keyways 44 and 46 is held adjacent the keyway 52 by the key wedge 48.

When the adapter 38 is in the "run" position shown in FIG. 3, its eccentricity extends opposite to that of the shaft portion 24A, providing the maximum flexing forces on the tube 14. There are four holes 53 in the end face of the adapter for a spanner wrench by which the adapter may be rotated between the "run" position and a "grind" position 180 degrees therefrom, in which the eccentricity of the adapter matches that of the shaft portion 24A, providing no flexing force on the tube 14. If the keyways 44 or 46 and 52 are slightly misaligned after rotation of the adapter, the parts will be aligned when the key wedge 48 is screwed into the adapter due to the beveled surfaces of the key wedge.

An inner race 54 of a conventional bearing 56 is retained on the adapter lateral surface portion 58 by a washer 60 and nut 62. The bearing 56 includes the usual rollers 64 and outer race 66, which is retained in the tube 14 by a cupshaped member 68, the race 66 being retained against an inwardly extending lip 69 thereof by a collar 70 and end cap 72, which is secured with the cup 68 to the tube 14 by a plurality of screws 74.

The end cap 72 contains a fill port 76, which may be closed by a plug 77, and a drain port 78, which may be closed by a plug 79. The ports 76 and 78 are for filling the roller 10 with lubricating oil for the internal bearings therein, and for draining oil from the roller, respectively.

The end cap 72 at each end of the roller 10 has ports 76 and 78, and the roller is readily filled with oil by removing the plug 77 at one end and the plug 79 at the other end, and positioning the roller so that the ports 76 are up (as shown in FIG. 1). Then the roller is filled through the open port 76 until oil starts dripping from the open port 78 at the other end, at which time the filling is terminated and the open ports are plugged.

Mounted on the end cap 72 at one end of the roller 10 is a conventional commutator 81 which contacts a conventional brush 82, which is mounted on the side frame 12. This electrical connection is used to ground the roller 10, or to introduce electrostatic assist to the roller, i.e. to put electrical charge on the covering 16, as is well known to those skilled in the art, and is no part of the present invention.

The side frame 12 is formed with a concave circular surface 84 adapted to receive the end shaft 22 and pivotally mounts one end of a locking element 86, the other end of which has a bore 88 therethrough. A link 90 is pivoted at one end to the frame 12 and extends through the bore 88 when the locking element is in its locking position. The locking element may be tightened against the end shaft 22 to prevent rotation thereof by means of a nut 92 that threadedly engages the free end of the link 90.

A collar 94 is secured to the reduced diameter end portion 22A of the end shaft 22 by a set screw 95 and carries indicia 96 on the periphery thereof, which may be marked "0", "1", "2", "3" and spaced apart by 30 degrees, for example. These indicia cooperate with a pointer 98 on the locking element 86 to indicate the direction of eccentricity of the eccentric shaft portion 24A and thus the direction of the flexing force on the tube 14 when the adapter 38 is in the "run" position. The collar 94 has a plurality of bores 99, into which a bar may be inserted to "bar" or rotate the control shaft 18 to the desired position when the locking element 86 is released.

In FIGS. 1 and 3 the eccentric adapter 38 is in the "run" position and the control shaft 18 is in position "3", so that the flexing force on the tube 14 by the intermediate bearing 25 is directly down; i.e. the eccentricity of the adapter is up and that of the shaft portion 24A is down. If the impression roller 10 is out of contact with the design cylinder (not shown), the central portion will be flexed directly down toward the design cylinder. When the roller 10 is lowered to the design cylinder and sufficient force is applied to the ends of the roller through the side frames 12 by the conventional impression pressure system (not shown), a uniform engagement between the impression roller and the design cylinder is attained.

This avoids the prior art problem where the impression roller is bent over the lateral edges of the design cylinder thereby flexing the central portion of the roller up away from the design cylinder causing a nonuniform engagement therebetween.

If desired, the flex of the impression roller toward the design cylinder may be reduced by loosening the locking element 86 and rotating the control shaft 18 to the "2" or "1" position. This will not change the magnitude of the flexing force applied to the tube 14, but the direction of that force will be shifted away from the axis of the design cylinder, resulting in a reduced effective flex toward that axis. Thereby less force need be applied to the ends of the impression roller to effect a uniform engagement between that roller and the design cylinder.

In addition, when the flex of the impression roller is shifted away from the design cylinder axis and toward the web flow, the roller tends to spread the web and thus prevent wrinkling thereof. This insures better running conditions.

The eccentric adapters 38 enable the impression roller 10 to be readily assembled or disassembled while there is no flexing force exerted on the tube 14, i.e. while there is no stress on the tube tending to bend it.

To assemble the impression roller, first all elements of the center bearing 25 except for the outer race 36 are mounted on the eccentric shaft portion 24A, making certain that the race halves 26A and 26B are located so that the load of the bearing will not be concentrated at a gap therebetween, and then the control shaft 18 is slid into the tube 14, where it rests on the outer race 36. Next the two cups 68 are slid into the tube ends, the bearings 56 are assembled on the respective adapters 38, the "grind" keyways 46 are aligned with the respective keyways 52, and the adapters 38 are slid onto the respective end shafts 22 and pushed until the outer race 66 engages the lip 69.

With the adapters 38 in the "grind" position, their eccentricity matches, i.e. is aligned with, that of the shaft portion 24A, so that the adapters are easily pushed into place because no flexing forces are exerted on the tube 14 or the control shaft 18, and so the tube is not flexed. Next the adapters 38 are rotated 180 degrees with a spanner wrench to the "run" position. This causes flexing forces to be exerted on the tube 14 upwardly by the adapters 38 and downwardly by the shaft portion 24A.

Then the key wedges 48 are inserted into the respective keyways 44 and 52, and screwed into the respective adapters, thereby aligning the parts if the keyways are slightly misaligned. The collars 70 are inserted and the end caps 72 are secured. Then the roller 10 is filled with lubricating oil as described above, and the commutator 81 is mounted on one end of the roller.

If it becomes necessary to regrind the rubber covering 16 to obtain the desired surface, the end caps 72 are removed and the oil is drained. The key wedges 48 are removed, the adapters 38 are rotated to the "grind" position, and the key wedges are reinstalled. Thus no flexing force is applied to the tube 14, and the tube is not flexed. The roller is installed in the grinder so that the driving head thereof drives the tube 14.

It will be understood that the embodiment of the invention described above is merely exemplary and that persons skilled in the art may make many variations and modifications without departing from the spirit and scope of the invention. For example, while a single eccentric bearing 25 at the center of the tube 14 is preferred, two or more eccentric bearings could be located intermediate the ends of the tube, if desired. Also, the eccentricity of the system could be varied even more by adding one or more additional keyways in the adapters 38 intermediate the keyways 44 and 46, to permit smaller flexing forces to be applied to the tube. All such modifications and variations are intended to be within the scope of the invention as defined in the appended claims.

I claim:

1. A roller adapted to engage and cooperate with a tangential cylinder disposed with its axis substantially parallel with the axis of the roller, the movement of the roller into engagement with the tangential cylinder tending to flex the intermediate portion of the roller away from the tangential cylinder, comprising a continuous hollow cylinder mounted for rotation about the axis thereof and engageable with said tangential cylinder, a control shaft disposed within the hollow cylinder, eccentric means mounted on the control shaft intermediate the ends of the hollow cylinder for exerting a radial force on the hollow cylinder tending to flex the intermediate portion of the hollow cylinder toward the tangential cylinder, thereby improving the uniformity of the engagement between the hollow cylinder and the tangential cylinder, means locking the ends of the control shaft in an adjusted position to orient the eccentric means mounted on the control shaft relative to the axis of the tangential cylinder, an eccentric sleeve mounted for rotation on each end of the control shaft, a bearing mounted on each sleeve for the rotation of the hollow cylinder, each eccentric sleeve being rotatable on the control shaft between two predetermined positions, one position relative to the intermediate eccentric means mounted on the control shaft to render the intermediate eccentric means operative to flex the shaft and another position to release the flexure and neutralize the intermediate eccentric means, and a two-position releasable locking means interconnecting each of the eccentric sleeves and the control shaft for locking the adjustable eccentric sleeves on the control shaft in one of said predetermined positions to render the intermediate eccentric means operative to flex the cylinder, said releasable locking means permitting quick release and adjustment of the eccentric sleeves for rotation on the control shaft from the one predetermined position to the other.

2. In a printing couple including a printing cylinder and a roller for printing on a web fed through the printing couple in which the roller is adapted to engage and cooperate with the printing cylinder disposed with its axis substantially parallel with the axis of the roller, the engagement of the roller with the cylinder tending to flex the intermediate portion of the roller away from the cylinder and effect non-uniform pressure engagement between the roller and the printing cylinder, comprising a continuous hollow cylinder mounted for rotation about the axis thereof, a control shaft disposed within the hollow cylinder for supporting the hollow cylinder for rotation, adjustable means mounted on the control shaft intermediate the ends of the hollow cylinder for exerting a radial force on the hollow cylinder tending to flex the intermediate portion of the hollow cylinder toward the printing cylinder, eccentric sleeves rotatably mounted on the ends of the control shaft, bearings carried by the sleeves for the rotation of the hollow cylinder, a two-position releaseable locking means interconnecting each of the eccentric sleeves and the control shaft for locking the rotatable sleeves on the control shaft in predetermined positions to flex the intermediate portion of the hollow cylinder toward the printing cylinder or in predetermined positions to release the flexure, said releasable locking means permitting quick release and adjustment of the eccentric sleeves for rotation on the control shaft from one predetermined position to the other, and neans locking the ends of the control shaft an adjusted position relative to the axis of the printing cylinder to offset the radial force and the flexure of the intermediate position of the hollow cylinder from the axis of the printing cylinder in the downstream direction of the web and prevent wrinkling.

3. The roller according to claim 1 or 2 in which the releasable locking means includes means establishing a pair of locking positions circumferentially spaced apart from each other on each end of the control shaft and means carried by each adjustable eccentric sleeve for facilitating quick adjustment from one locked position to the other locked position, one locked position locking the eccentric sleeves relative to the control shaft in a running position in which the cylinder is flexed and the other locked position locking the eccentric sleeves relative to the control shaft in a unflexed condition for grinding.

4. A roller as set forth in claim 1 or 2, including indicating means on the control shaft and on the control shaft locking means to indicate the adjusted position of the flexure.

5. A roller adapted to engage and cooperate with a tangential cylinder disposed with its axis substantially parallel with the axis of the roller, the movement of the roller into engagement with the tangential cylinder tending to flex the intermediate portion of the roller away from the tangential cylinder, comprising a continuous hollow cylinder mounted for rotation about the axis thereof and engageable with said tangential cylinder, a control shaft disposed within the hollow cylinder, eccentric means mounted on the control shaft intermediate the ends of the hollow cylinder for exerting a radial force on the hollow cylinder tending to flex the intermediate portion of the hollow cylinder toward the tangential cylinder, thereby improving the uniformity of the engagement between the hollow cylinder and the tangential cylinder, means locking the ends of the control shaft in an adjusted position to orient the eccentric means mounted on the control shaft relative to the axis of the tangential cylinder, an eccentric sleeve mounted for rotation on each end of the control shaft, a bearing mounted on each sleeve for the rotation of the hollow cylinder, each eccentric sleeve being rotatable on the control shaft between one position relative to the intermediate eccentric means mounted on the control shaft to render the intermediate eccentric means operative to flex the shaft and another position to release the flexure and neutralize the intermediate eccentric means, and releaseable locking means for locking the adjustable eccentric sleeves on the control shaft in said one position to render the intermediate eccentric means operative to flex the cylinder and in said other position to release the flexure, said releasable locking means including alignable keyways in the shaft and in the adjustable eccentric sleeves and a releasable key engageable therewith and permitting release of the eccentric sleeve for rotation on the control shaft from one position to the other.

* * * * *